US007206421B1

(12) United States Patent
Taenzer

(10) Patent No.: US 7,206,421 B1
(45) Date of Patent: Apr. 17, 2007

(54) HEARING SYSTEM BEAMFORMER

(75) Inventor: Jon C. Taenzer, Los Altos, CA (US)

(73) Assignee: GN ReSound North America Corporation, Redwood City, CA (US)

( * ) Notice: Subject to any disclaimer, the term of this patent is extended or adjusted under 35 U.S.C. 154(b) by 826 days.

(21) Appl. No.: 09/617,108

(22) Filed: Jul. 14, 2000

(51) Int. Cl.
*H04B 1/00* (2006.01)

(52) U.S. Cl. ...................................... 381/119; 381/94.1

(58) Field of Classification Search ................ 381/119, 381/92, 94.1, 58, 94.3, 312, 317, 321, 320
See application file for complete search history.

(56) References Cited

U.S. PATENT DOCUMENTS

| | | | | |
|---|---|---|---|---|
| 3,992,584 | A * | 11/1976 | Dugan | 381/82 |
| 4,956,867 | A | 9/1990 | Zurek et al. | |
| 5,228,093 | A * | 7/1993 | Agnello | 381/119 |
| 5,414,776 | A * | 5/1995 | Sims, Jr. | 381/119 |
| 5,764,778 | A * | 6/1998 | Zurek | 381/312 |
| 6,240,192 | B1 | 5/2001 | Brennan et al. | |
| 6,697,494 | B1 | 2/2004 | Klootsema et al. | |

OTHER PUBLICATIONS

McKinney, E.D. et al., "A Two-microphone Adaptive Broadband Array for Hearing Aids", School of Electrical Engineering, The University of Oklahoma, pp. 933-936.

Greenberg, Julie E. et al, "Evaluation of an adaptive beamforming method for hearing aids", J. Acoust. Soc. Am. 91 (3), Mar. 1992, pp. 1662-1676.

Stadler, R.W. et al., "On the potential of fixed arrays for hearing aids", J. Acoust. Soc. Am. 94 (3), Pt. Sep. 1, 1993, pp. 1332-1342.

Zurek, Patrick M. et al., "Prospect and Limitations of Microphone-Array Hearing Aids", Research Laboratory of Electronics Massachuetts Institute of Technology, Bad Zwischenahn Aug. 31-Sep. 5, 1995, pp. 233-244.

Desloge, Joseph G. et al., "Microphone-Array Hearing Aids with Binaural Output—Part I: Fixed-Processing Systems", IEEE Transactions on Speech and Audio Processing, vol. 5, No. 6, Nov. 1997, pp. 529-542.

Welker, Daniel P. et al., "Microphone-Array Hearing Aids with Binaural Output—Part II: A Two-Microphone Adaptive System", IEEE Transactions on Speech and Audio Processing, vol. 5, No. 6, Nov. 1997, pp. 543-551.

Greenberg, Julie E. "Modified LMS Algorithms for Speech Processing with an Adaptive Noise Canceller", IEEE Transactions on Speech and Audio Processing, vol. 6, No. 4, Jul. 1998, pp. 338-351.

* cited by examiner

*Primary Examiner*—Ping Lee
(74) *Attorney, Agent, or Firm*—Bingham McCutchen LLP

(57) ABSTRACT

The present invention, generally speaking, picks up a voice or other sound signal of interest and creates a higher voice-to-background-noise ratio in the output signal so that a user enjoys higher intelligibility of the voice signal. In particular, beamforming techniques are used to provide optimized signals to the user for further increasing the understanding of speech in noisy environments and for reducing user listening fatigue. In one embodiment, signal-to-noise performance is optimized even if some of the binaural cues are sacrificed. In this embodiment, an optimum mix ratio or weighting ratio is determined in accordance with the ratio of noise power in the binaural signals. Enhancement circuitry is easily implemented in either analog or digital form and is compatible with existing sound processing methods, e.g., noise reduction algorithms and compression/expansion processing. The sound enhancement approach is compatible with, and additive to, any microphone directionality or noise canceling technology.

20 Claims, 19 Drawing Sheets

SHAW DATA – Azimuthal Interaural Difference

| Azimuthal Angle | IAD 800 Hz | IAD 1kHz | IAD 2kHz | IAD 4kHz |
|---|---|---|---|---|
| (Deg.) | (dB) | (dB) | (dB) | (dB) |
| 0 | 0 | 0 | 0 | 0 |
| 10 | 1.4 | 2.3 | 1.8 | 3 |
| 20 | 2.7 | 4.5 | 3.5 | 6.4 |
| 30 | 4 | 6.8 | 5.2 | 9.2 |
| 40 | 5.3 | 8.5 | 6.8 | 12 |
| 50 | 5.9 | 9.5 | 8.36 | 14.1 |
| 60 | 6 | 9.2 | 9.8 | 15.2 |
| 70 | 5.8 | 8.2 | 10.3 | 15 |
| 80 | 5.75 | 7.4 | 9.5 | 14 |
| 90 | 5.6 | 7 | 8.6 | 12.8 |
| 100 | 5.7 | 7.4 | 9.5 | 12.05 |
| 110 | 5.85 | 8.5 | 10.3 | 11.4 |
| 120 | 6 | 9.3 | 9.8 | 9.8 |
| 130 | 5.9 | 9.8 | 8.35 | 7.7 |
| 140 | 5.5 | 9 | 6.8 | 6 |
| 150 | 4.5 | 7.35 | 5.2 | 4.2 |
| 160 | 3.1 | 4.9 | 3.5 | 2.7 |
| 170 | 1.7 | 2.5 | 1.8 | 1.3 |
| 180 | 0 | 0 | 0 | 0 |

FIG. 15

BEAMFORMER – Azimuthal Dependence of Electrical Phase Difference

| Azimuthal Angle | BF Phase 800 Hz | BF Phase 1kHz | IAD 2KHz | IAD 4KHz |
|---|---|---|---|---|
| (Deg.) | (Deg.) | (Deg.) | (Deg.) | (Deg.) |
| 0 | 0 | 0 | 0 | 0 |
| 5 | | | | |
| 10 | | | | |
| 15 | | | | 180 |
| 20 | | | | |
| 25 | | | | |
| 30 | | | 180 | 360 |
| 35 | | | | |
| 40 | | | | |
| 45 | | | | 540 |
| 50 | | | | |
| 55 | | | | |
| 60 | | 180 | 360 | 720 |
| 65 | | | | |
| 70 | | | | |
| 75 | | | | |
| 80 | | | | |
| 85 | | | | |
| 90 | >180 | | | |

FIG. 17

Using the 1 kHz Pattern As the Desired Reference Polar Pattern

| FREQ. | ACTION | IAD SLOPE (dB/ADeg.) | PHASE SLOPE(EDeg./ADeg.) | PHASE RATE (EDeg./dB) | CORRECTION (EDeg./dB) |
|---|---|---|---|---|---|
| At 500 Hz | Double the phase rate | 16 dB / 70 deg. = 0.22587 | 90 / 60 = 1.5 | 6.563 | 6.563 |
| At 1 kHz | Do Nothing | 16 dB / 120 deg. = 0.13333 | 180 / 60 = 3 | 22.500 | 0 |
| At 2 kHz | Halve the phase rate | 10 dB / 60 deg. = 0.16667 | 180 / 30 = 6 | 36.000 | -18 |
| At 4 kHz | Quarter the phase rate | 12 dB / 40 deg. = 0.30000 | 180 / 15 = 12 | 40.000 | -30 |

CONTROL SURFACE – Electr. Deg.

| IAD (dB) | FREQ(kHz) | | | | | | |
|---|---|---|---|---|---|---|---|
| | 0.5 | | 1 | | 2 | | 4 |
| 0 | 0.00 | 0.00 | 0.00 | 0.00 | 0.00 | 0.00 | 0.00 |
| 1 | 6.56 | 3.28 | 0.00 | -9.00 | -18.00 | -24.00 | -30.00 |
| 2 | 13.13 | 6.56 | 0.00 | -18.00 | -36.00 | -48.00 | -60.00 |
| 3 | 19.69 | 9.84 | 0.00 | -27.00 | -54.00 | -72.00 | -90.00 |
| 4 | 28.25 | 13.13 | 0.00 | -36.00 | -72.00 | -96.00 | -120.00 |
| 5 | 32.82 | 16.41 | 0.00 | -45.00 | -90.00 | -120.00 | -150.00 |
| 6 | 39.38 | 19.69 | 0.00 | -54.00 | -108.00 | -144.00 | -180.00 |
| 7 | 45.94 | 22.97 | 0.00 | -63.00 | -126.00 | -166.00 | -210.00 |
| 8 | 52.50 | 28.25 | 0.00 | -72.00 | -144.00 | -192.00 | -240.00 |
| 9 | 59.07 | 29.53 | 0.00 | -81.00 | -162.00 | -216.00 | -270.00 |
| 10 | 65.63 | 32.82 | 0.00 | -90.00 | -180.00 | -240.00 | -300.00 |
| 11 | 72.19 | 36.10 | 0.00 | -99.00 | -198.00 | -264.00 | -330.00 |
| 12 | 78.76 | 39.38 | 0.00 | -108.00 | -216.00 | -288.00 | -360.00 |
| 13 | 85.32 | 42.66 | 0.00 | -117.00 | -234.00 | -312.00 | -390.00 |
| 14 | 91.88 | 45.94 | 0.00 | -126.00 | -252.00 | -336.00 | -420.00 |
| 15 | 96.45 | 49.22 | 0.00 | -135.00 | -270.00 | -360.00 | -450.00 |
| 16 | 105.01 | 52.50 | 0.00 | -144.00 | -288.00 | -384.00 | -480.00 |
| 17 | 111.57 | 55.79 | 0.00 | -153.00 | -306.00 | -408.00 | -510.00 |
| 18 | 118.13 | 59.07 | 0.00 | -162.00 | -324.00 | -432.00 | -540.00 |
| 19 | 124.70 | 62.35 | 0.00 | -171.00 | -342.00 | -456.00 | -570.00 |
| 20 | 131.26 | 65.63 | 0.00 | -180.00 | -360.00 | -480.00 | -600.00 |

FIG. 19

HEARING SYSTEM BEAMFORMER

BACKGROUND OF THE INVENTION

1. Field of the Invention

The present invention relates to sound signal enhancement.

2. State of the Art

For the hearing impaired, clearly hearing speech is very difficult for hearing aid wearers, especially in noisy locations. Discrimination of the speech signal is confused because directional cues are not well received or processed by the hearing impaired, and the normal directional cues are poorly preserved by standard hearing aid microphone technologies. For this reason, electronic directionality has been shown to be very beneficial, and directional microphones are becoming common in hearing aids. However, there are limitations to the amount of directionality achievable in microphones alone. Therefore, further benefits are being sought by the use of beamforming techniques, utilizing the multiple microphone signals available for example from a binaural pair of hearing aids.

Beamforming is a method whereby a narrow (or at least narrower) polar directional pattern can be developed by combining multiple signals from spatially separated sensors to create a monaural, or simple, output signal representing the signal from the narrower beam. Another name for this general category of processing is "array processing," used, for example, in broadside antenna array systems, underwater sonar systems and medical ultrasound imaging systems. Signal processing usually includes the steps of adjusting the phase (or delay) of the individual input signals and then adding (or summing) them together. Sometimes predetermined, fixed amplitude weightings are applied to the individual signals prior to summation, for example to reduce sidelobe amplitudes.

With two sensors, it is possible to create a direction of maximum sensitivity and a null, or direction of minimum sensitivity.

One known beamforming algorithm is described in U.S. Pat. No. 4,956,867, incorporated herein by reference. This algorithm operates to direct a null at the strongest noise source. Since it is assumed that the desired talker signal is from straight ahead, a small region of angles around zero degrees is excluded so that the null is never steered to straight ahead, where it would remove the desired signal. Because the algorithm is adaptive, time is required to find and null out the interfering signal. The algorithm works best when there is a single strong interferer with little reverberation. (Reverberant signals operate to create what appears to be additional interfering signals with many different angles of arrival and times of arrival—i.e., a reverberant signal acts like many simultaneous interferers.) Also, the algorithm works best when an interfering signal is long-lasting—it does not work well for transient interference.

The prior-art beamforming method suffers from serious drawbacks. First, it takes too long to acquire the signal and null it out (adaptation takes too long). Long adaptation time creates a problem with wearer head movements (which change the angle of arrival of the interfering signal) and with transient interfering signals. Second, it does not beneficially reduce the noise in real life situations with numerous interfering signals and/or moderate-to-high reverberation.

A simpler beamforming approach is known from classical beamforming. With only two signals (e.g., in the case of binaural hearing health care, one from the microphone at each ear) classical beamforming simply sums the two signals together. Since it is assumed that the target speech is from straight ahead (i.e., that the hearing aid wearer is looking at the talker), the speech signal in the binaural pair of raw signals is highly correlated, and therefore the sum increases the level of this signal, while the noise sources, assumed to be off-axis, create highly uncorrelated noise signals at each ear. Therefore, there is an enhancement of the desired speech signal over that of the noise signal in the beamformer output. This enhancement is analogous to the increased sensitivity of a broadside array to signals coming from in front as compared to those coming from the side.

This classical beamforming approach still does not optimize the signal-to-noise (voice-to-background) ratio, however, producing only a maximum 3 dB improvement. It is also fixed, and therefore cannot adjust to varying noise conditions.

SUMMARY OF THE INVENTION

The present invention, generally speaking, picks up a voice or other sound signal of interest and creates a higher voice-to-background-noise ratio in the output signal so that a user enjoys higher intelligibility of the voice signal. In particular, beamforming techniques are used to provide optimized signals to the user for further increasing the understanding of speech in noisy environments and for reducing user listening fatigue. In one embodiment, signal-to-noise performance is optimized even if some of the binaural cues are sacrificed. In this embodiment, an optimum mix ratio or weighting ratio is determined in accordance with the ratio of noise power in the binaural signals. Enhancement circuitry is easily implemented in either analog or digital form and is compatible with existing sound processing methods, e.g., noise reduction algorithms and compression/expansion processing. The sound enhancement approach is compatible with, and additive to, any microphone directionality or noise cancelling technology.

BRIEF DESCRIPTION OF THE DRAWING

The present invention may be further understood from the following description in conjunction with the appended drawing. In the drawing:

FIG. 15 is a table showing interaural difference as a function of azimuth angle;

FIG. 17 is a table corresponding to that of FIG. 15, showing propagation phase difference ("electrical" phase difference) as a function of azimuth angle;

FIG. 19 is a table representing a control surface on which the correction factors of FIG. 18 are located;

DETAILED DESCRIPTION OF THE PREFERRED EMBODIMENTS

Underlying the present invention is the recognition that, for any ratio of noise power in the binaural signals, for example, there is an optimum mix ratio or weighting ratio that optimizes the SNR of the output signal. For example, if the noise power is equal in each signal, such as in a crowded restaurant with people all around, moving chairs, clattering plates, etc., then the optimum weighting is 50%/50%. In other environments, the noise power in the two signals will be quite unequal, e.g., on the side of a road. If there is more noise in one signal by, for example 10 dB, the optimum mix is not 50/50, but moves toward including a greater amount of the quieter signal. In the case of a 10 dB noise differential, the optimum noise mix is 92% quieter signal and 8% noisier signal. Such a result is counterintuitive, where intuition would suggest simply using the quieter signal. Simply using the quieter signal would be optimal only if the noise and voice both had the same amount of correlation. However, in nearly all real-world situations, the voice signals are highly correlated, while the noise signals are not. This disparity biases the optimum point.

Figure 1:
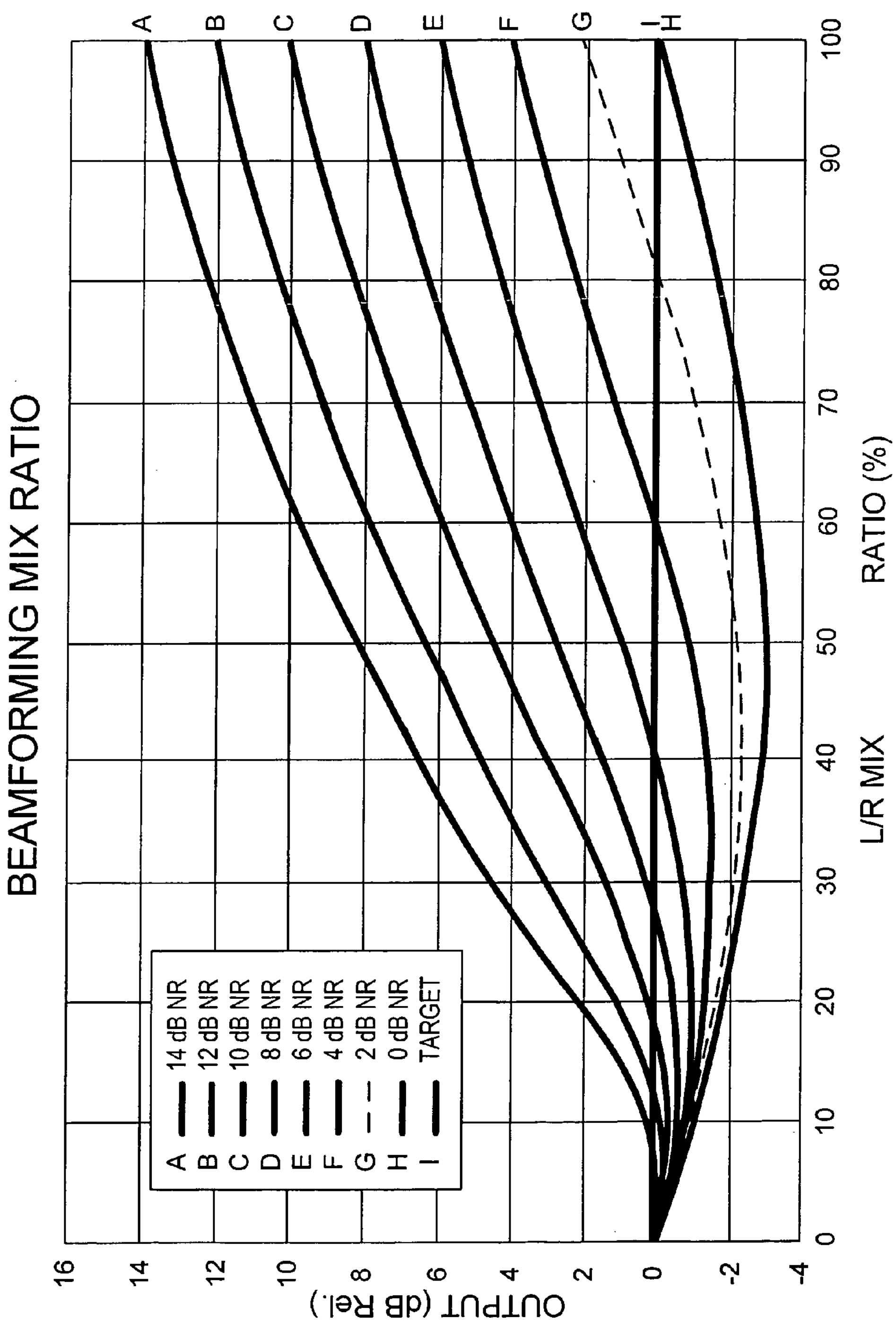
FIG. 1 is a graph illustrating how the optimum mix ratio for two sound signals varies in accordance with the noise ratio of the two sound signals.

FIG. 1 shows a comparison plot of voice power (target) and noise power in the output signal as a function of mix ratio. Note that whereas the voice power stays constant with mix ratio, the noise power does not. Rather, as the ratio of noise power in the two signals increases (i.e., there is a greater imbalance in the noise "picked up" at each ear), the optimum mix ratio moves to weight the quieter signal heavier than the noisier, signal before summing the two signals to form the output signal. The optimum mix ratio occurs where the noise in the output is minimum.

Figure 2:
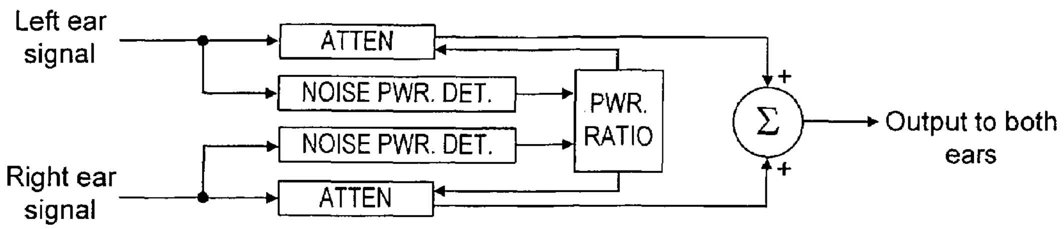
FIG. 2 is a block diagram illustrating a beamforming technique in accordance with one embodiment of the invention.

Referring now to FIG. 2, a block diagram is shown of a beamforming apparatus in accordance with one embodiment of the present invention. Assume a system having two input signals, i.e., a right ear signal and a left ear signal. The left ear signal is input in parallel to an attenuator and to a noise power determination block. The noise power determination block measures the noise power of the signal and outputs a noise level signal $P_{NL}$. Similarly, the right ear signal is input in parallel to an attenuator and to a noise power determination block which outputs a signal $P_{NR}$. Noise level signals from the noise power determination blocks are input to a power ratio block, which determines, based on the relative noise levels of the two input signals, an appropriate weighting ratio, e.g., 50/50, 40/60, 60/40, etc. The weighting ratio may be determined using the following formulas:

$$\frac{P_{NL}}{P_{NL}+P_{NR}}+W_R$$

$$1-W_R=W_L$$

Corresponding control signals are applied to the respective attenuators to cause the input signals to be attenuated in proportion to the input signal's weighting ratio. For example, for a 60/40 weight, the left input signal is attenuated to 60% of its input value while the right input signal is attenuated to 40% of its input value. Attenuated versions of the input signals, attenuated by the optimum amount, are then applied to a summing block, which sums the attenuated signals to produce an output signal that is then applied to both ears.

Noise measurement may be performed as described in U.S. application Ser. No. 09/247,621 filed Feb. 10, 1999, incorporated herein by reference. Generally speaking, a noise measurement is obtained by squaring the instantaneous signal and filtering the result using a low-pass filter or valley detector (opposite of peak detector).

Figure 3:
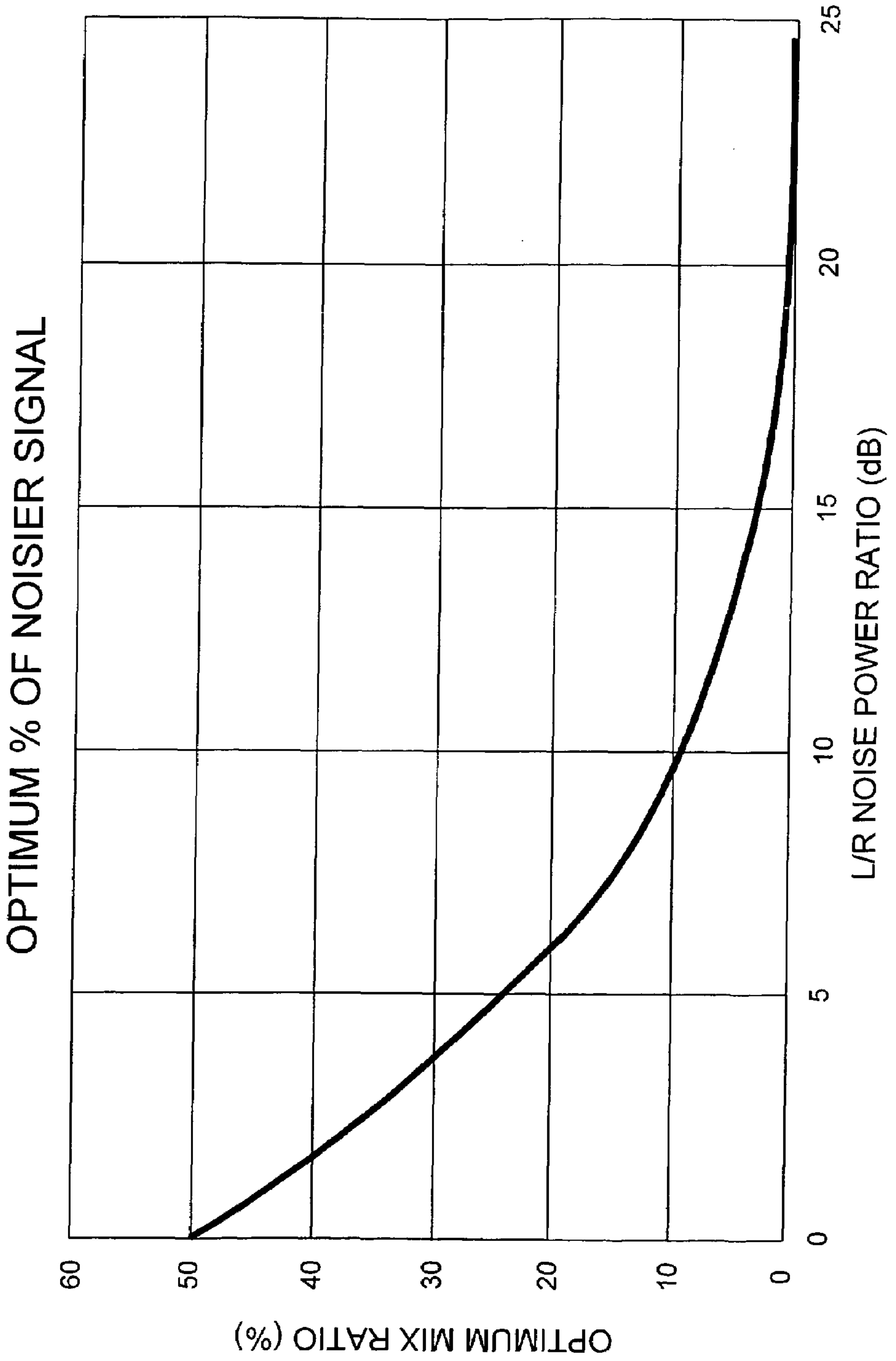
FIG. 3 is a graph illustrating one suitable control function for the power ratio block of FIG. 2.
Figure 4:
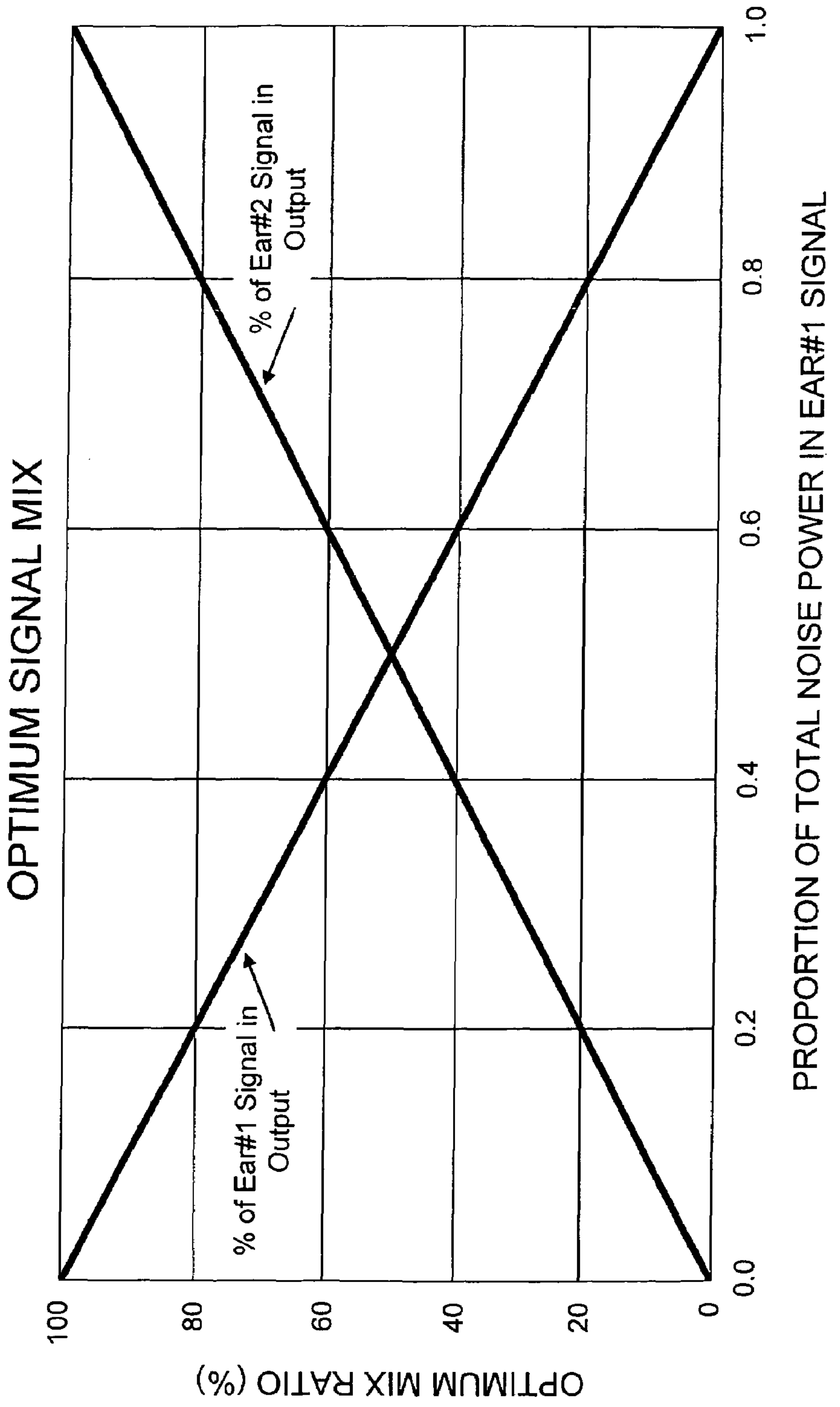
FIG. 4 is a graph illustrating another control function for the power ratio block of FIG. 2.

One suitable control function for the power ratio block is shown in FIG. 3. As the noise power in one ear's signal exceeds the noise power in the other ear's signal, the optimum percentage of the noisier signal's contribution to the output signal decreases. In FIG. 3, the comparison of noise powers is made using the decibel scale. If instead the comparison of noise powers is made using simple proportions, then the control function becomes linear as shown in FIG. 4.

Figure 5:
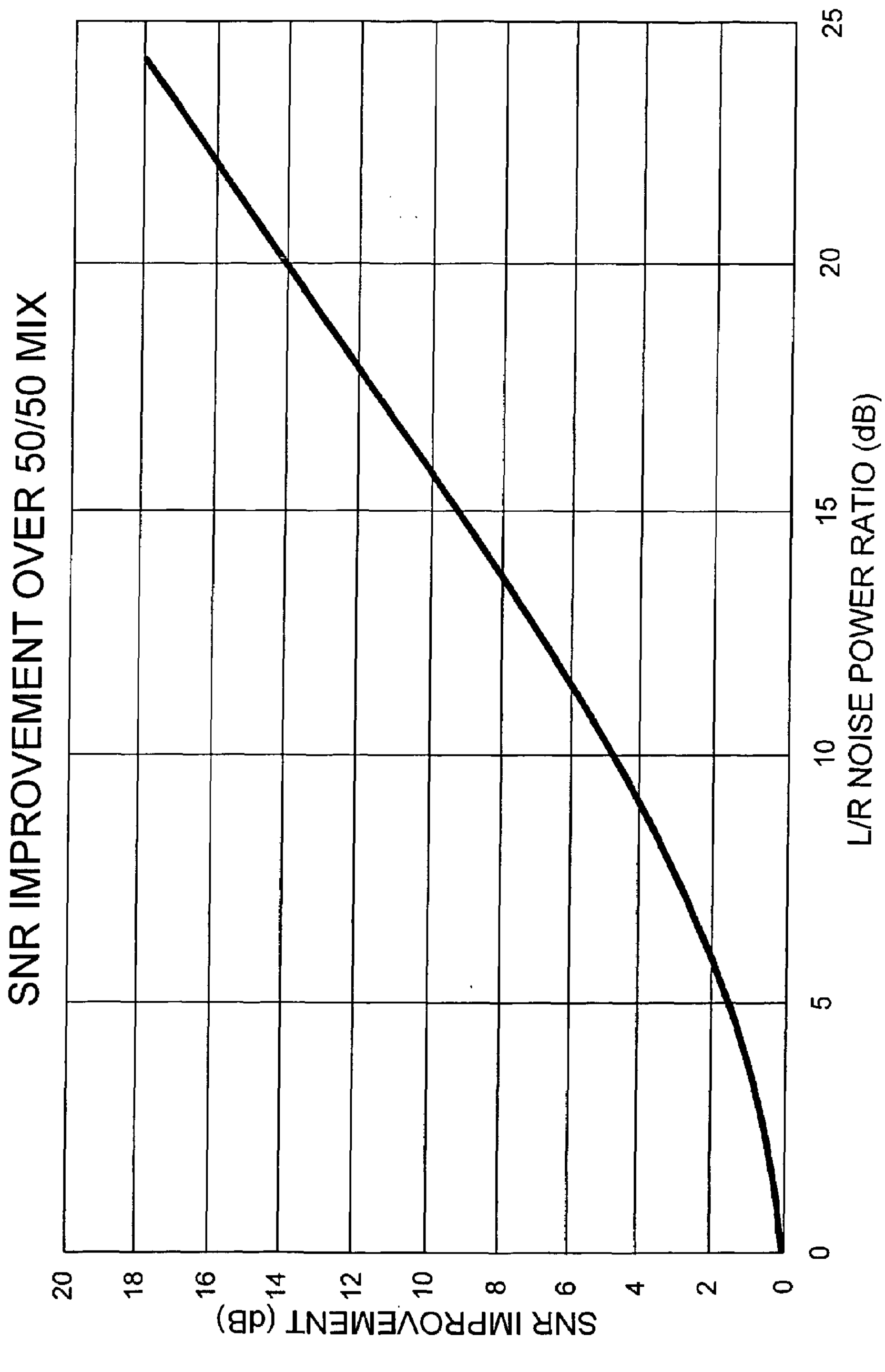
FIG. 5 is a graph illustrating relative noise improvement using the present beamforming technique as compared to using a 50/50 signal mix.
Figure 6:
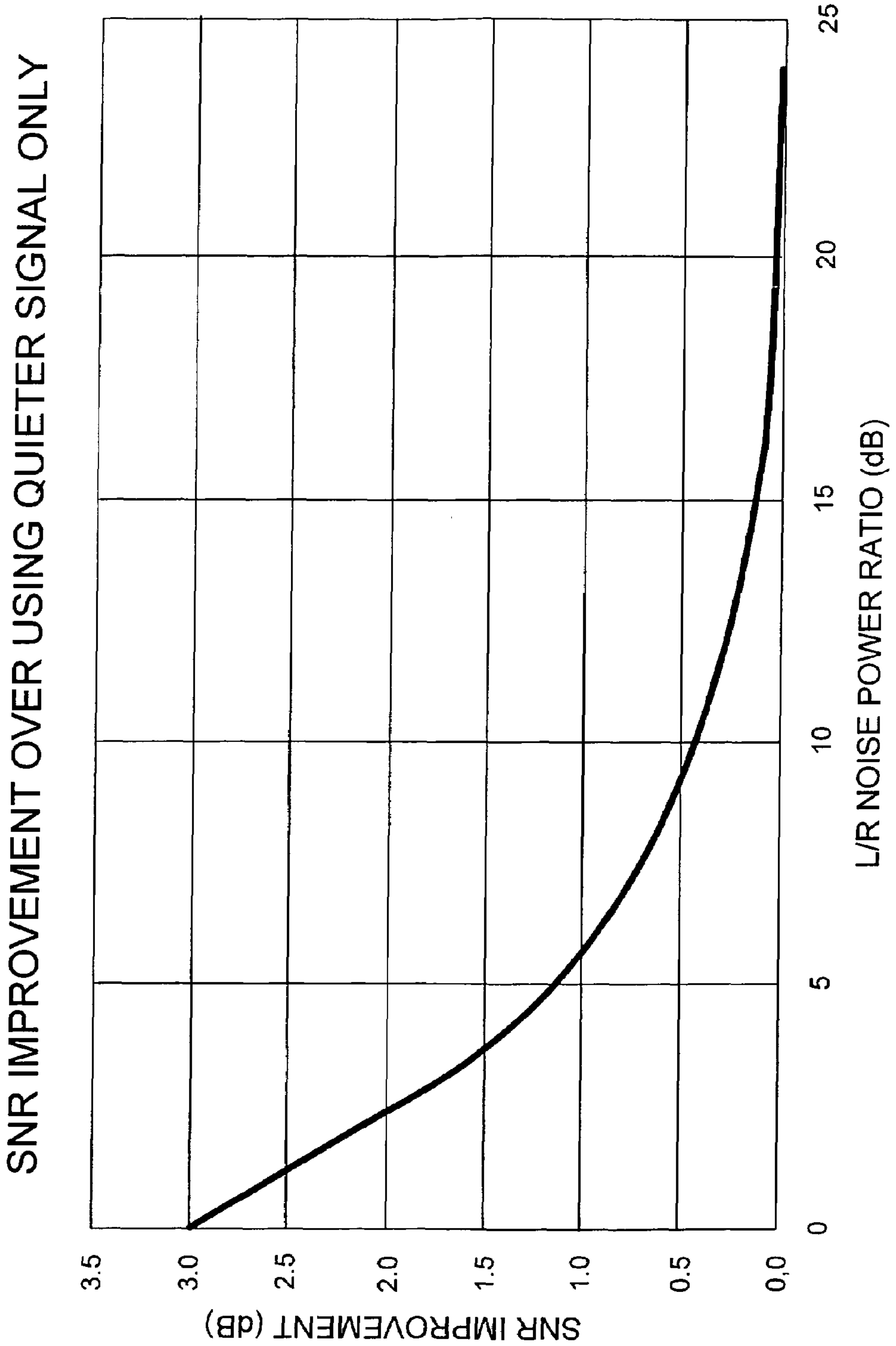
FIG. 6 is a graph illustrating relative noise improvement using the present beamforming technique as compared to using the quieter signal only.

The resulting SNR improvement over classical 50/50 beamforming achieved using the foregoing control strategy is shown in FIG. 5. Realistic noise ratio values give relative SNR improvements that are dramatic. FIG. 6 shows the resulting SNR improvement over using the quieter signal only.

Assuming that the signal of interest to the listener is straight ahead, then the signal of interest will be equal in both ears. Signals from other directions, which because of head shadowing are not equal in both ears, may therefore be considered to be noise. If a signal is equal in both ears, then beamforming has no effect on it. Therefore, although noise power detectors may be used as shown in FIG. 2, a simpler approach is to use simple signal power detectors as shown and described hereafter in relation to FIG. 9 and FIG. 10. Interestingly, one result of such a beamforming strategy is that the power in the signals from the two ears is equalized prior to combining the signals.

As a further improvement, the foregoing approach to beamforming is not limited to simultaneous operation on the signals over their entire bandwidths. Rather, the same approach can be implemented on a frequency-band-by-frequency-band basis. Existing sound processing algorithms of the assignee divide the audio frequency bandwidth into multiple separate, narrower bands. By applying the current method separately to each band, the optimum SNR can be achieved on a band-by-band basis to further optimize the voice-to-noise ratio in the overall output.

Figure 7:
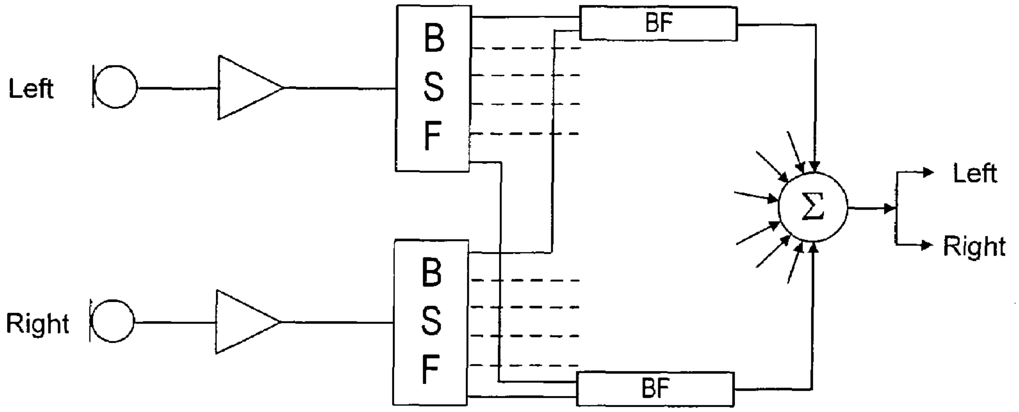
FIG. 7 is a block diagram of a multiband beamformer.

Referring more particularly to FIG. 7, there is shown a multiband beamformer in accordance with one embodiment of the invention. For each of the right ear and the left ear, a microphone produces an input signal which is amplified and applied to a band-splitting filter (BSF). The BSF produces a number of narrower-band signals. Multiple beamformers (BF), one per band, are provided such as the beamformer of FIG. 2. Each beamformer receives narrower-band signals of a particular band and produces an enhanced output signal for that band. The resulting enhanced band signals are then summed to form a final output signal that is output to both the right ear and the left ear.

The multiband beamformer has the advantage of optimally reducing background noises from multiple sources with different spectral characteristics, for example a fan with mostly low-frequency rumble on one side and a squeaky toy on the other. As long as the interferers occupy different frequency bands, this multiband approach improves upon the single band method discussed above.

As a further enhancement, some binaural cues can be left in the final output by biasing the weightings slightly away from the optimum mix. For example, the right ear output signal might be weighted N % (say, 5–10%) away from the optimum toward the right ear signal, and the left ear output signal might be weighted N % away from the optimum toward the left ear signal. To take a concrete example, if the optimum mix was 60% left and 40% right, then the right ear would get 55% L+45% R and the left ear would get 65% L+35% R (with N=5%). This arrangement helps to make a more comfortable sound and "externalizes the image," i.e., causes the user to perceive an external aural environment containing discernible sound sources. Furthermore, this arrangement entails some but very little compromise of SNR. Referring again to FIG. 1, the shape of the curves is such that the minima are broad and shallow. Appreciable deviation from the minimum can therefore be tolerated with very little discernible decrease in noise reduction.

More generally, N may be regarded as a "binaurality coefficient" that controls the amount of binaural information retained in the output. Such a binaurality coefficient may be used to control the beamformer smoothly between full binaural (N=100%; no beamforming) to full beamforming (N=0%; no binaural). This binaurality parameter can be tailored for the individual. As this parameter is varied, there is little loss of directionality until after the binaural cues are significantly restored, so the directionality and noise reduction benefits of the beamformer's signal processing can still be realized even with a usable level of binaural cue retention.

Furthermore, human binaural processing tends to be lost in proportion to hearing deficit. So those individuals most needing the benefits that can be provided by the beamforming algorithm tend to be those who have already lost the ability to beneficially utilize their natural binaural processing for extracting a voice from noise or babble. Thus, the algorithm can provide the greatest directionality benefit for those needing it the most, but can be adjusted, although with a loss of directionality, for those with better binaural processing who need it less.

Figure 8:
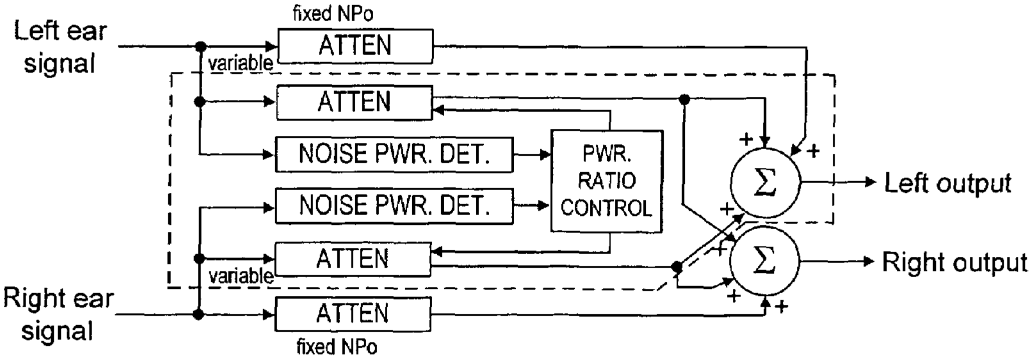
FIG. 8 is a block diagram of a binaural beamformer.

FIG. 8 shows a block diagram of a binaural sound enhancement system. Elements within the dashed-line block correspond to elements of the beamforming system of FIG. 2. Now, however, instead of a single summing block, two summing blocks are provided, one to form the output signal for the right ear and one to form the output signal for the left ear. Output signals from variable attenuators are applied to both of the summing blocks. In addition, fixed (or infrequently updated) attenuators are provided, one for each of the right ear signal and the left ear signal. The function of these attenuators is to provide an additional amount of an input signal to a corresponding one of the summing blocks. That is, a right fixed attenuator provides an additional amount of the right input signal to the right summing block, which produces a right output signal, and a left fixed attenuator provides an additional amount of the left input signal to the left summing block, which produces a left output signal.

The foregoing approach to beamforming is simple and therefore easy to implement. Whereas the adaptive method can take seconds to adapt, the present method can react nearly instantaneously to changes in noise or other varying environmental conditions such as the user's head position, since there is no adaptation requirement. The present method, thus, can remove impulse noise such as the sound of a fork dropped on a plate at a restaurant or the sound of a car door being closed. Furthermore, noise power detectors are already provided in some binaural hearing aid sets for use in noise-reduction algorithms. The simple addition of two multipliers (attenuators) and an additional processing step enables dramatically improved results to be achieved. An important observation is that the improvement in voice-to-background noise that the invention provides is in addition to that of the noise-reduction created by pre-existing noise-reduction algorithms—further improving the SNR.

Moreover, the foregoing methods all lend themselves to easy implementation in digital form, especially using a digital signal processor (DSP). In a DSP implementation, all of the blocks are realized in the form of DSP code. Most of the required software functions are simply multiplications (e.g., attenuators) or additions (summing blocks). To do frequency band implementations, FFT methods may be employed. Outputs from FFT processes are easily analyzed as power spectra for implementing the noise power detectors. One such implementation divides the sound spectrum into 64 FFT bins and processes all 64 bins simultaneously every 3.5 ms. Thus, the beamformer is able to adjust for various noise conditions in 64 separate frequency bands at approximately 300 times each second.

Figure 9:
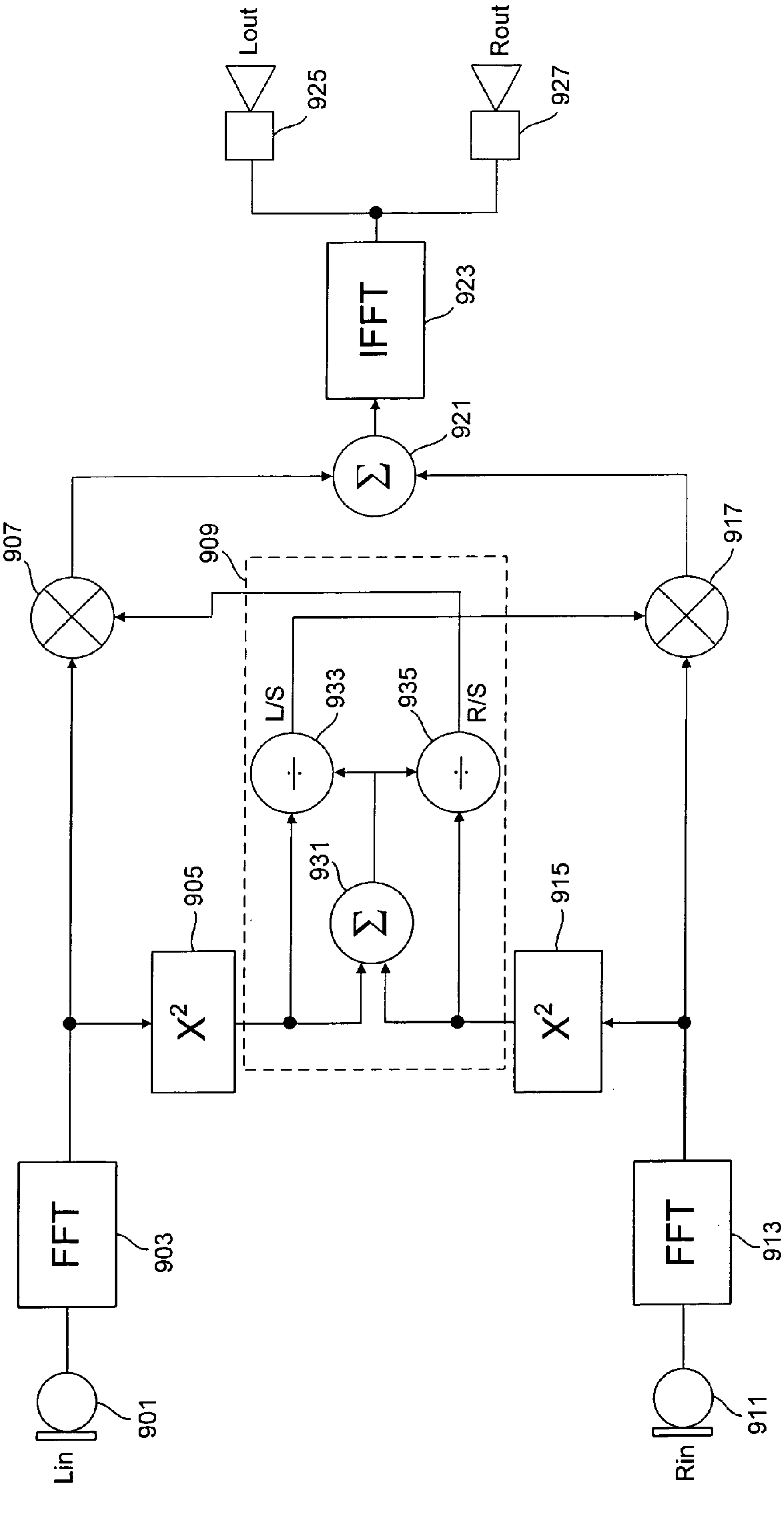
FIG. 9 is a block diagram of a one embodiment of a DSP-based beamformer.

Referring to FIG. 9, a block diagram is shown of a DSP-based monaural beamformer in accordance with one embodiment of the invention. The DSP approach uses well-known "overlap-add" techniques, various well-known details of which are omitted for simplicity. In the arrangement of FIG. 9, a signal from a left-ear microphone Lin 901 is transformed using an FFT (Fast Fourier Transform) 903 or similar transform. The resulting transformed signal feeds two separate operations, a squaring operation 905 and a multiplication operation 907. The multiplication operation may be considered as realizing an attenuator where the attenuation factor is set by a circuit 909. A signal from a right-ear microphone Rin 911 follows a corresponding path. Outputs of the multiplication operations for the left ear and the right ear are summed (921), inverse-transformed (923) and output to transducers of both the left ear and the right ear (925, 927).

The circuit 909 calculates attenuation ratios for the left and right ears by forming the sum S of the squares of the signals and by forming 1) the ratio L/S of the square of the left ear signal to the sum; and 2) the ratio R/S of the square of the right ear signal to the sum. The operations for forming these ratios are represented as an addition (931) and two divisions (933, 935). The resulting attenuation factors are coupled in cross-over fashion to the multipliers; that is, the signal L/S is used to control the multiplier for the right ear, and the signal R/S is used to control the multiplier for the left ear. Hence, as a noise source increases the signal level in one ear, the signal of the other ear is emphasized and the signal of the ear most influenced by the noise source is de-emphasized.

Figure 10:
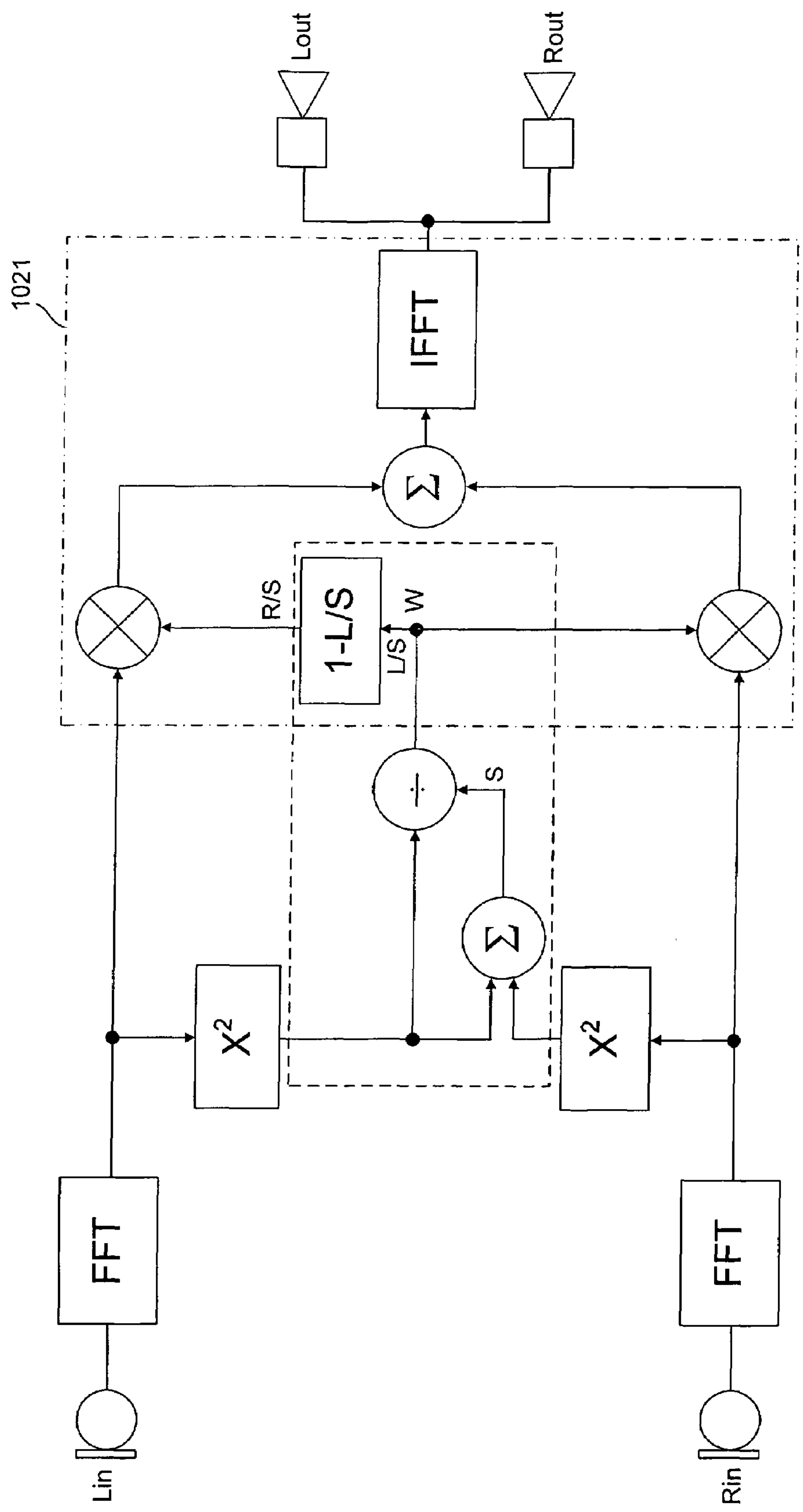
FIG. 10 is a block diagram of an alternative equivalent realization of the beamformer of FIG. 9.

The circuitry may be simplified to conserve compute power by, instead of performing two divisions, performing a single division and a subtraction as illustrated in FIG. 10. That is, once one of the ratios has been determined, the other ratio can be determined by subtracting the known ratio from 1, since the ratios must add to 1.

Figure 11:
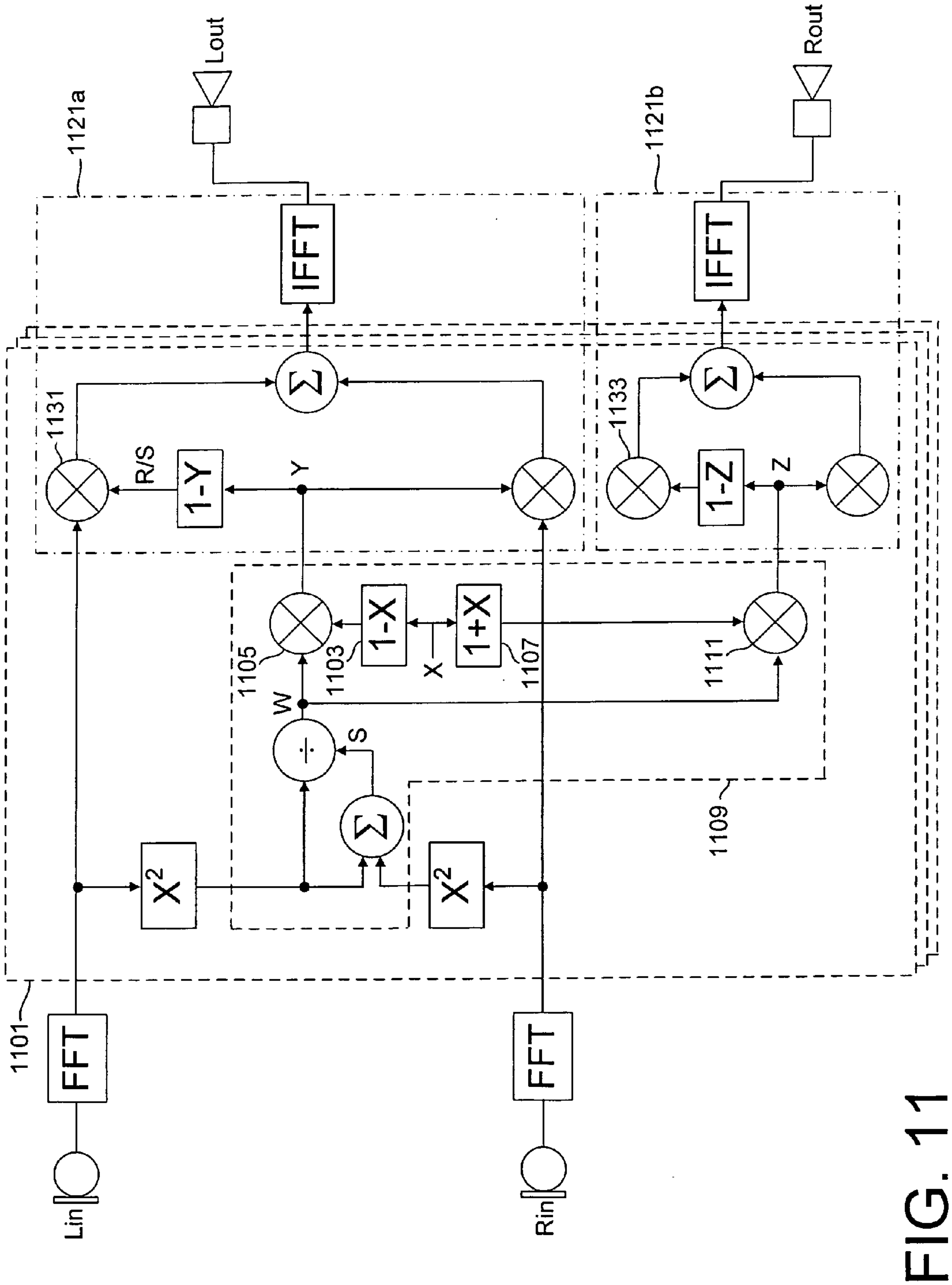
FIG. 11 is a block diagram of a another embodiment of a DSP-based beamformer.

An embodiment of a corresponding binaural DSP-based beamformer is shown in FIG. 11. Note that the operations within the block 1101 may be performed on a frequency-bin-by-frequency-bin basis. Hence, additional instances of this block are indicated in dashed lines. Instead of the left input signal contributing only to the left output signal and the right input signal contributing only to the right output signal as in the previous embodiment, in this embodiment, the operations are arranged such that both input signals may contribute, in different amounts, to both output signals. That is, referring in particular to the control block 1109, a binaurality control X is provided that "biases" the output signal for a particular ear toward the input signal for that ear. The binaurality control may be realized by a subtraction operation 1103 and a multiplication operation 1105, and by an additional operation 1107 and another multiplication operation 1111. In order to retain beamforming operation while preserving binaural cues to some degree, the binaurality control might be set within a range of 5 to 15%. However, the binaurality control may also be set to one extreme or the other or anywhere in between. If the binaurality control is set to 0%, then operation becomes the same as in the case of the monaural beamformer of FIG. 9. If the binaurality control is set to 100%, then full-stereo operation ensues and any beamforming action is lost.

The remainder of the arrangement of FIG. 11 may be appreciated by noting that the output processing block 1021 of FIG. 10 occurs twice, once for the left ear (1121*a*) and once for the right ear (1121*b*), since the output signals to the two ears may be different. Note also that in the arrangement of FIG. 11, two different nodes Y and Z correspond generally to the node W of FIG. 10, reflecting the "biasing apart" of the two channels. (It is assumed in FIG. 11, however, that the attenuation factors applied to the multipliers 1131 and 1133 are bounded within the range from 0 to 1.) In other respects, the arrangement of the two DSP-based embodiments is similar.

To take a particular example of the operation of the arrangement of FIG. 11, assume that the binaurality control is set to 10%. First assume a "no noise" situation in which the ratio L/S is 0.5. To obtain the signal at node Y, L/S is decreased by 10% to 0.45. At the same time, to obtain the signal at node Z, L/S is increased by 10% to 0.55. In the output processing stage, to form the left output signal, the left input signal is multiplied by a factor 1−0.45=0.55, and the right output signal is multiplied by 0.45. To form the right output signal, the left input signal is multiplied by a factor 1−0.55=0.45, and the right output signal is multiplied by 0.55.

Now assume a noisy situation in which the ratio L/S is 0.6. To obtain the signal at node Y, L/S is decreased by 10% to 0.54. At the same time, to obtain the signal at node Z, L/S is increased by 10% to 0.66. In the output processing stage, to form the left output signal, the left input signal is multiplied by a factor 1−0.54=0.46, and the right output signal is multiplied by 0.54. To form the right output signal, the left input signal is multiplied by a factor 1−0.66=0.44, and the right output signal is multiplied by 0.66. In both output signals, the right (quieter) input signal is weighted more heavily, but in the left output signal, the left input signal is weighted more heavily than it would otherwise be, and in the right output signal, the right input signal is weighted more heavily than it would otherwise be for optimum noise reduction.

In accordance with a further aspect of the invention, beamforming can be performed selectively within one or more frequency ranges. In particular, since most binaural directionality cues are carried by the lower frequencies (typically below 1000 Hz), an enhancement to the beamformer would be to pass the frequencies below, say, 1000 Hz directly to their respective ears, while beamforming only those frequency bins above that frequency in order to achieve better SNR in the higher frequency band where directionality cues are not needed.

In one implementation, the beamforming algorithm is simply applied only to the higher frequencies as stated.

In another implementation, a look-up table is provided having a series of "binaurality" coefficients, one for each frequency bin, to control the amount of binaural cues retained at each frequency. The use of such a "binaurality coefficient" to control the beamformer smoothly between full binaural (no beamforming) to full beamforming (no binaural) has been previously described. By extending this concept to provide for per-bin binaurality coefficients, the coefficients for each low frequency bin may be biased far toward, or even at, full binaural processing, while the coefficients for each high frequency bin may be biased toward, or completely at, full beamforming, thus achieving the desired action. Although the coefficients could abruptly change at some frequency, such as 1000 Hz, more preferably, the transition occurs gradually over, say, 800 Hz to 1200 Hz, where the coefficients "fade" smoothly from full binaural to full beamforming.

Note that other beamforming methods, although inferior to those disclosed, may also be used to enhance sound signals. In addition, a beamformer as described herein can be used in products other than hearing aids, i.e., anywhere that a more "focused" sound pickup is desired.

EXAMPLE

The foregoing beamforming methods demonstrate very high directionality, and enable the user of a binaural hearing aid product to be provided with a "super directionality" mode of operation for those noisy situations where conversation is otherwise extremely difficult. Second-order microphone technology may be used to further enhance directionality.

The described beamformer was modeled in the dSpace/MatLab environment, and the MLSSA method of directionality measurement was implemented in the same environment. The MLSSA method, which uses signal autocorrelation, is quite immune to ambient noises and gives very clean results. Only data for the usual 500, 1000, 2000 and 4000 Hz frequencies was recorded. Two BZ5 first-order directional microphones were placed in-situ on a KEMAR mannequin, and the 0× axis was taken to be a line straight in front of the mannequin as is standard practice. Measurements were taken at 3.75× increments between +30× and at 15× increments elsewhere. Care was taken to ensure that the system was working well above the noise floor and below saturation or clipping.

Figure 12:
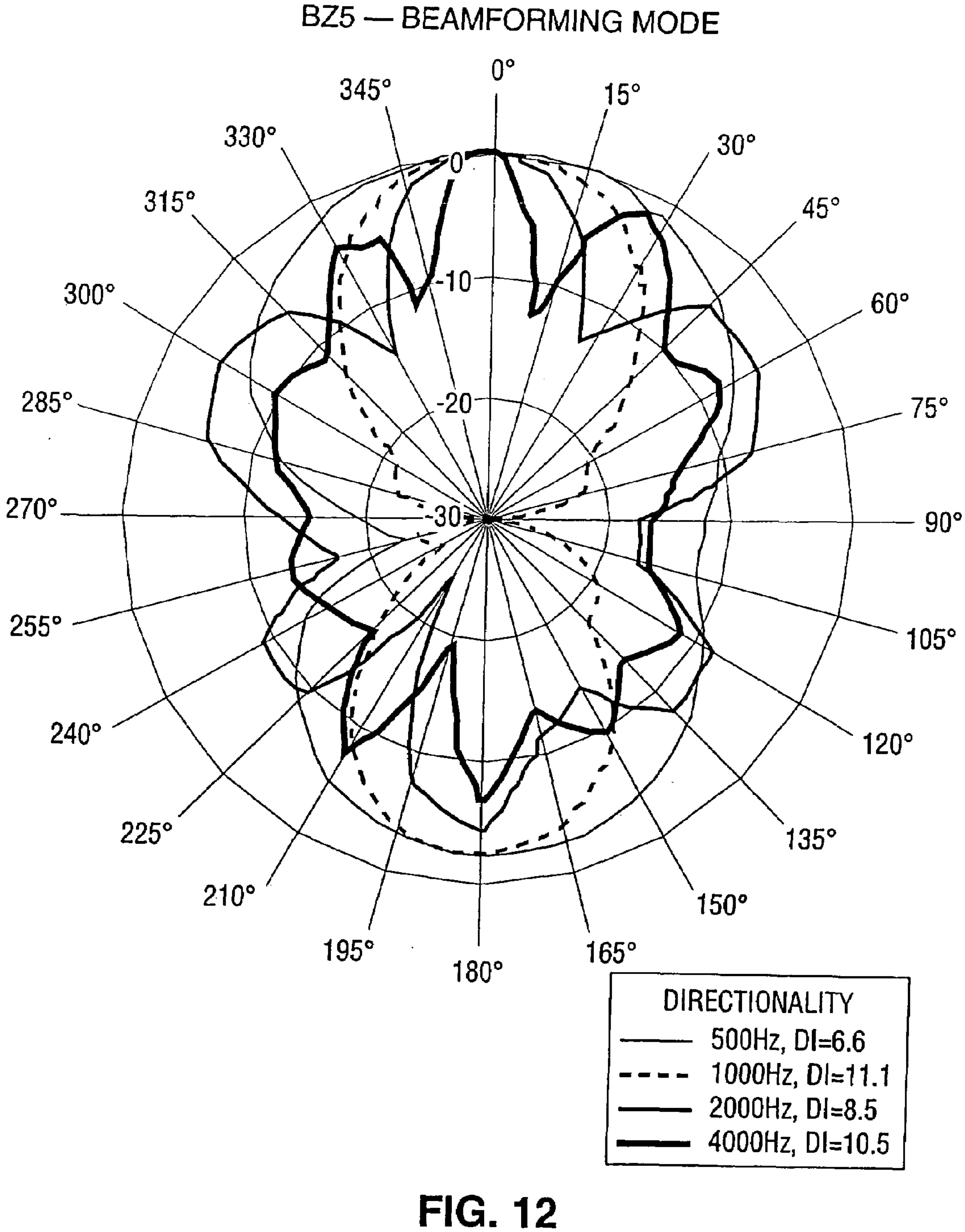
FIG. 12 is a plot is a plot of the polar response patterns and DI values in a beamforming system using first-order directional microphones.

FIG. 12 shows the polar response characteristics and the calculated Directionality Index (DI) of the beamforming system for each of the four recorded frequencies. Beamforming inherently affects only the horizontal characteristics of the directional pattern and does not affect symmetry about the front-to-back axis. A narrowed horizontal pattern with left-right symmetry is therefore expected and is demonstrated in FIG. 12.

Figure 13:
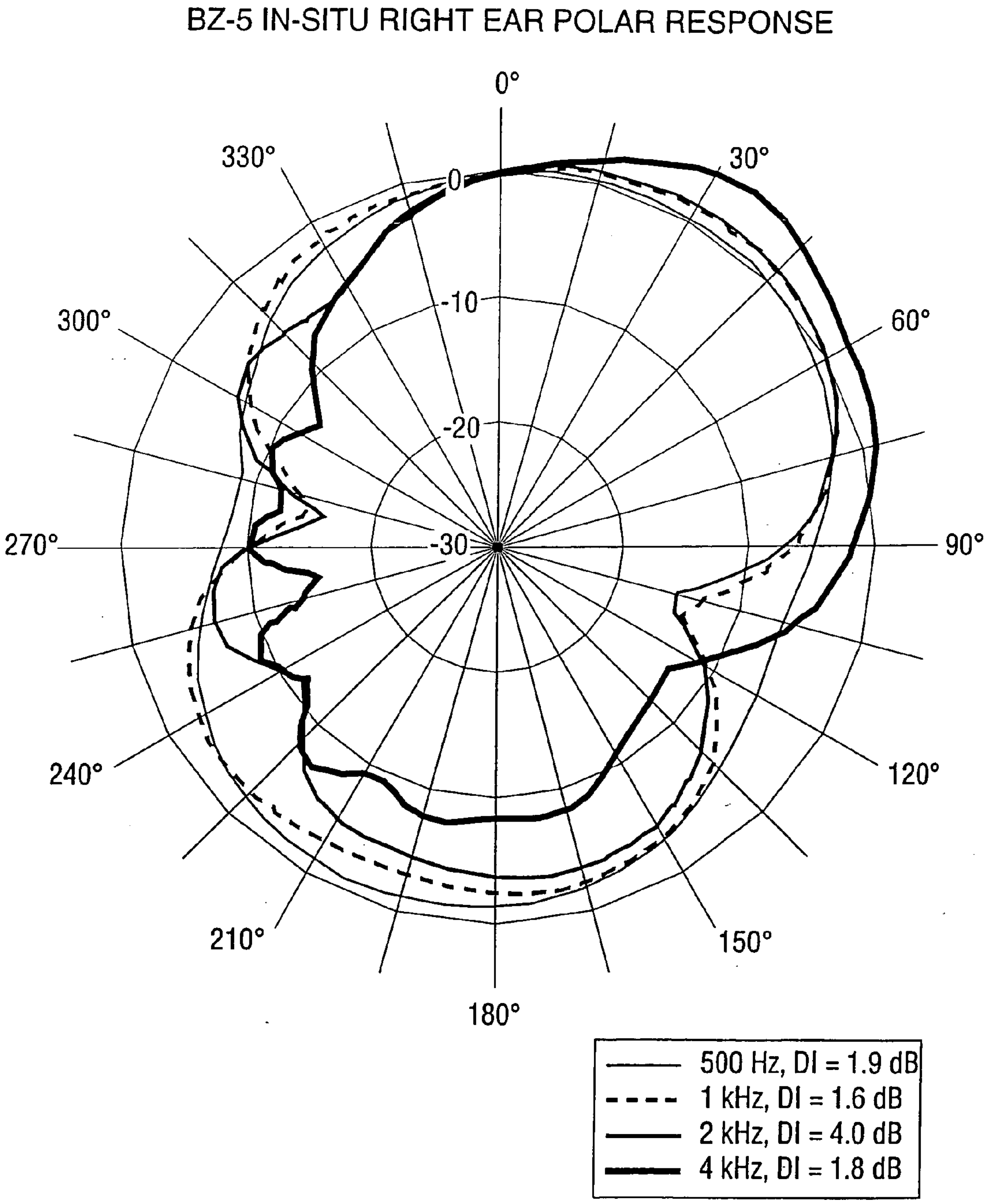
FIG. 13 is a plot of the polar response patterns and DI values of a conventional first-order microphone without beamforming.

As compared to DI values for a single microphone, shown in FIG. 13, the calculated in-situ DI values of FIG. 12 demonstrate a remarkable improvement, averaging upwards of 9 dB over the four tested frequencies as compared to a value of less than about 5 dB for typical first-order microphones. The benefits of the described beamformer are therefore clearly evident: higher directionality can be achieved than with any single or binaural pair of hearing aid acting independently.

Figure 14:
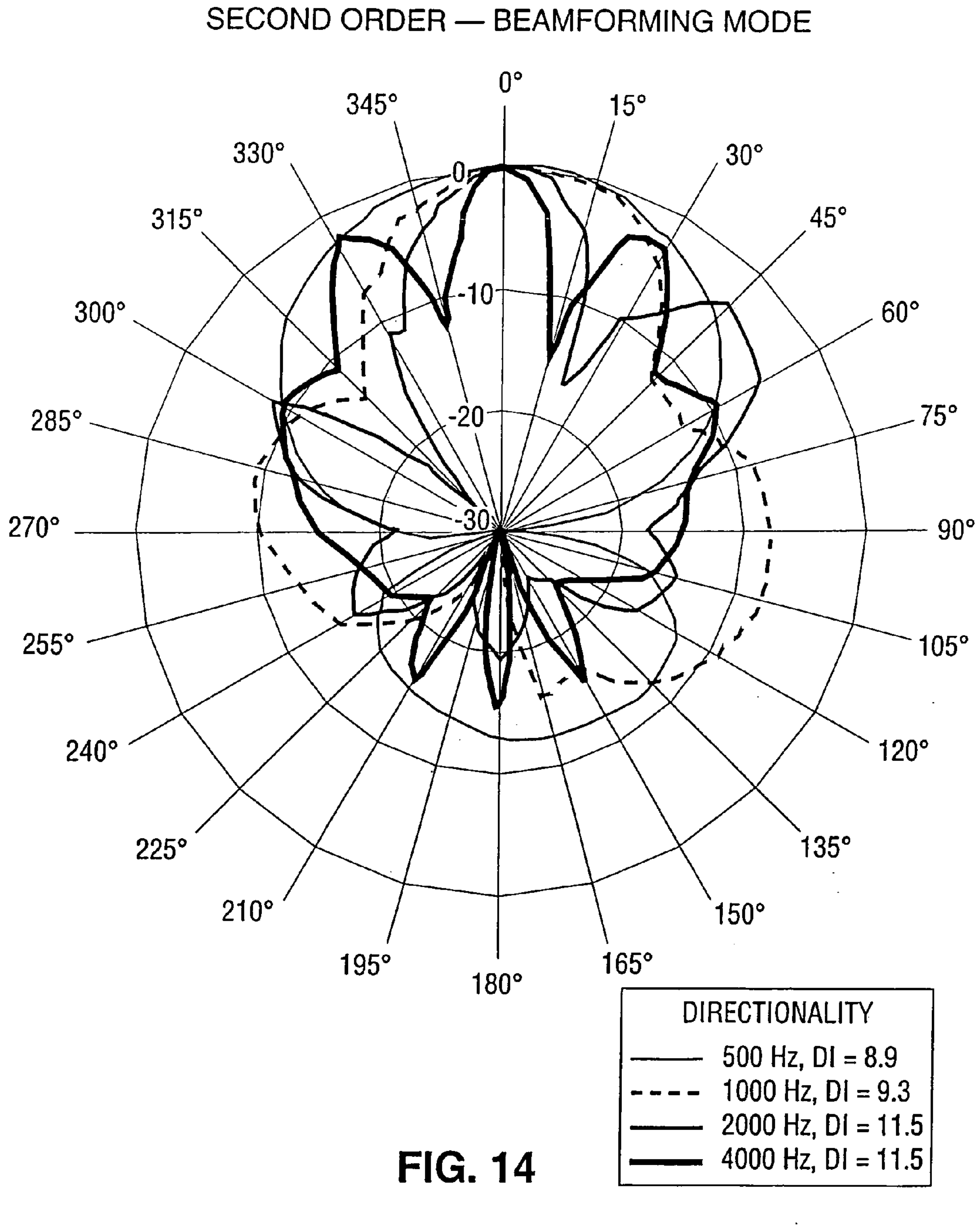
FIG. 14 is a plot of the polar response patterns and DI values using second-order directional microphones.

Directionality can be improved further still using second-order microphones. Since the second-order microphones have superior directionality, as compared to first-order designs, especially with respect to their front-to-back ratio, this property of the second-order microphone complements the beamformer's processing algorithm, which is limited to side-to-side enhancement. Thus, the combined result is a very narrow, forward-only beam pattern as shown in FIG. 14.

Unlike prior art beamformers, the present beamforming technique is based upon Head Related Transfer Functions (HRTFs) documented in the paper by E.A.G. Shaw. HRTFs describe the effects of the head upon signal reception at the ears, and include what is called "head shadowing." In particular, the present method uses the head shadowing effect to optimize SNR.

Furthermore, whereas prior art beamforming systems usually include delay or phase shift of signals in addition to amplitude-based operations, the foregoing embodiments of the present beamformer do not. Only amplitudes are adjusted or modified—thereby making the present beamformer simpler and less costly to implement.

In other embodiments, however, phase adjustment may be used to provide a more natural sound quality and in fact to further improve the directionality of the beamformer. Note that in the pattern of FIG. 12, for example, peaks and nulls occur at different positions for different frequencies. The cause of these peaks and nulls in the beam pattern is the relative signal phase between right ear and left ear signals (as distinguished from head shadowing, which is relates to the amplitude difference—Interaural Difference, or IAD—caused by the head). The relative signal phase between the right ear and left ear signals is due to the path length difference for off-axis signals—i.e. the signal from a source located, say, 45 degrees to the right will arrive at the right ear before it arrives at the left ear. The path length difference translates directly into a delay time, because of the essentially constant speed of sound in air. In turn, a constant delay translates directly into a phase shift which is directly proportional to frequency.

As previously described, the basic beamformer algorithm has the attribute of matching (in amplitude) the contribution from each ear's signal to the output. Accordingly, an N×180 degree phase shift will create a deep null, i.e. nearly perfect cancellation, and an N×360 degree phase shift will create a +6-dB peak. This is one reason why the beamformer polar pattern shows such distinct peaks and nulls. If the amplitudes weren't well matched, the peaks and nulls would be much less distinct, although there would still be as many and at the same angle locations.

Due to the relatively large spacing between the two ear microphones (sensors), a large path length difference for the two signals exists. In turn, this creates a large phase shift for relatively small off-axis (azimuthal) angles, and thus, enough phase shift to reach 180, 360, 540, 720, etc. electrical degrees for arrival angles between 0 and 90 azimuthal degrees, especially at the higher frequencies. This is the second reason that the beamformer pattern shows numerous peaks and nulls. A closer spacing (a pin head, for example) would move the peaks and nulls azimuthally toward 90 degrees, so that fewer would show up. If the spacing were small enough, no peaks or nulls would show up at all, except at very high frequencies.

The most desirable response pattern in FIG. 12 is the response pattern for 1000 Hz. The following description will describe how the response patterns for other frequencies can be made to have a very similar response pattern, resulting in a more natural sound and greater directionality.

Figures 16, 18:
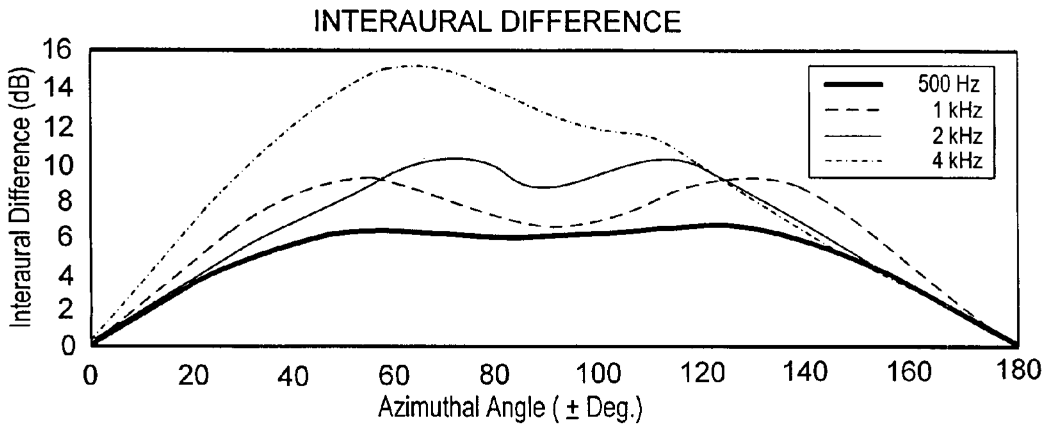
FIG. 16 is a graph corresponding to the table of FIG. 15.
FIG. 18 is a table showing correction factors based on the data of FIG. 16 and FIG. 17.

Referring to FIG. 15, a table is shown presenting known data regarding IAD as a function of azimuthal angle. This data may be represented graphically as shown in FIG. 16. As seen in FIG. 16, depending on frequency, IAD is quite linear from 0 degrees azimuthal angle to between 40 and 70 degrees azimuthal angle FIG. 17 shows a partial table of the azimuthal dependence of electrical phase difference in the embodiment of the beamformer previously described. Agreement between FIG. 17 and FIG. 12 may be readily observed. A clear pattern emerges from FIG. 17, i.e., each time the frequency is halved (from 4 kHz to 2 kHz, 2 kHz to 1 kHz, etc.), as would be expected, the azimuthal angle for a particular null or peak doubles. For example, at 4 kHz, the first null occurs at 15 degrees. At 2 kHz, the first null occurs at 30 degrees. In order to "equalize" the phases of the various signals to match the phase of the 1 kHz signal, the following actions are required: at 500 Hz, double the (azimuthal-angle-dependent) phase rate; at 1 kHz, do nothing; at 2 kHz, halve the phase rate; and at 4 kHz, quarter the phase rate.

Since IAD already forms the basis of the beamformer as previously described, it is desirable to, for each frequency, obtain a phase correction factor in terms of IAD (measured in dB) to be applied to the signal at that frequency to bring that signal substantially into phase with the 1 kHz signal. These correction factors may be obtained in the manner shown in FIG. 18. An IAD slope (in dB/ADeg.) is obtained from FIG. 16, and a phase slope (EDeg./ADeg.) is obtained from FIG. 17. Dividing the latter by the former results in the phase rate (EDeg./dB). Given the phase rate for a particular frequency, the action to be taken at that frequency determines the appropriate correction factor. For example, at 500 Hz, the phase rate is to be doubled. Since the phase rate is 6.563 EDeg./dB, the correction to be applied is also 6.563 EDeg./dB. At 2 kHz, the phase rate (36 EDeg./dB) is to be halved, resulting in a correction of −18 EDeg./dB.

Figure 20:
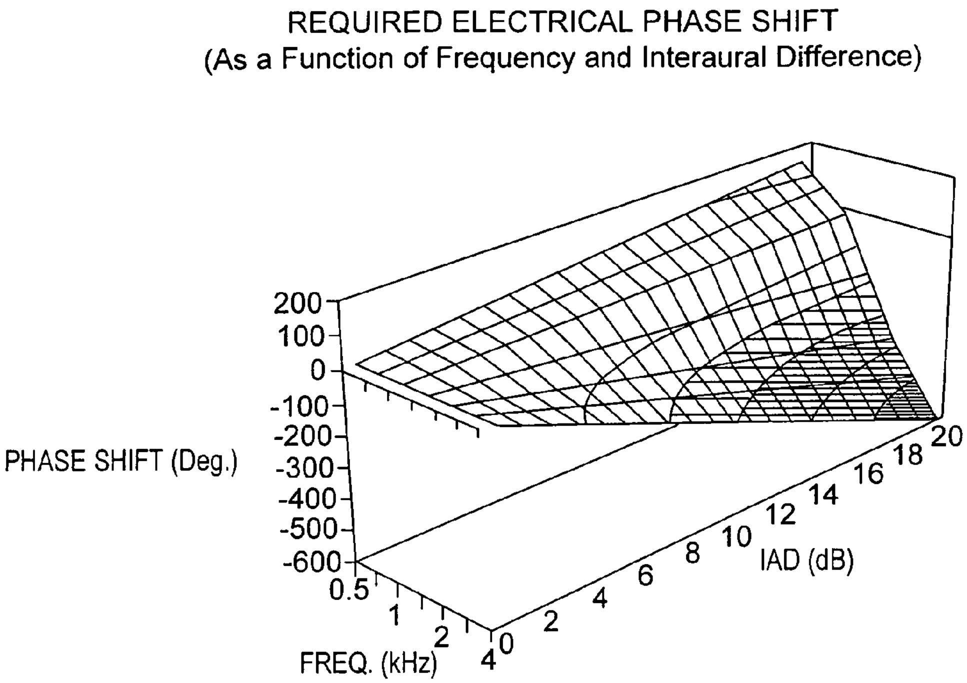
FIG. 20 is a depiction of the control surface of FIG. 19.
Figure 21:
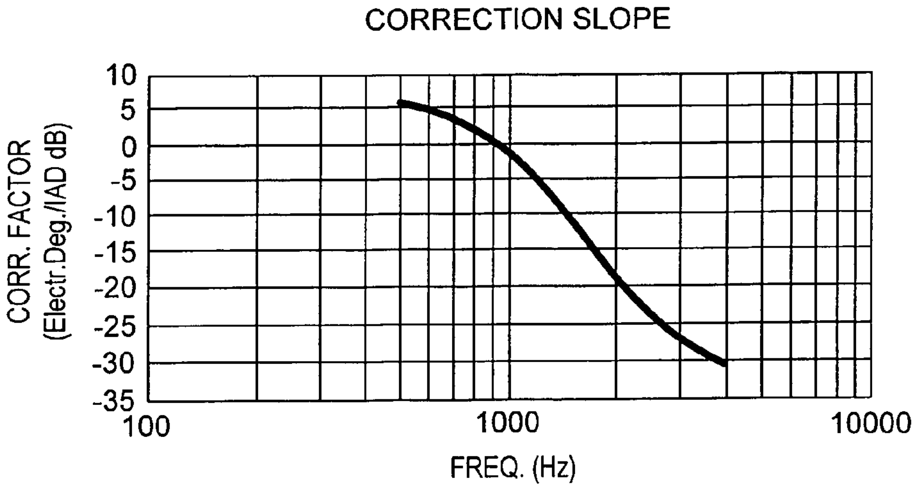
FIG. 21 is a graph of correction factor versus frequency.

Using the correction values of FIG. 18, a table representing a control surface for performing phase "equalization" may be obtained as shown in FIG. 19. A graph of the control surface is shown in FIG. 20. The information of FIG. 19 and FIG. 20 may be represented more compactly in the form of a correction slope graph, shown in FIG. 21. If a look-up table approach to phase equalization is used, then the representation of FIG. 19 and FIG. 20 is preferred. If a mathematical approach to phase equalization is used, then the representation of FIG. 21 is preferred.

Figure 22:
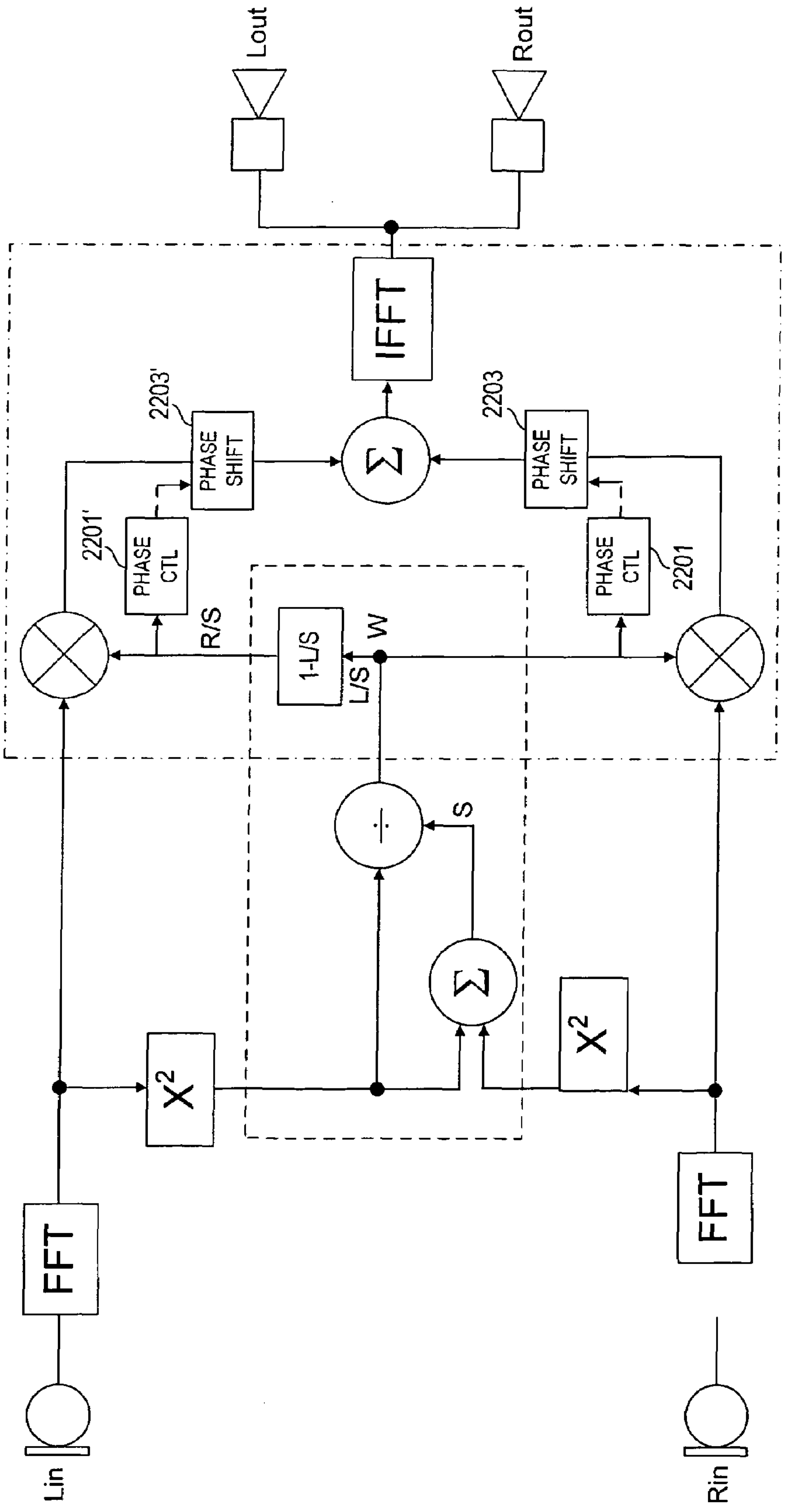
FIG. 22 is a block diagram of a monaural beamforming system with IAD correction.
Figure 23:
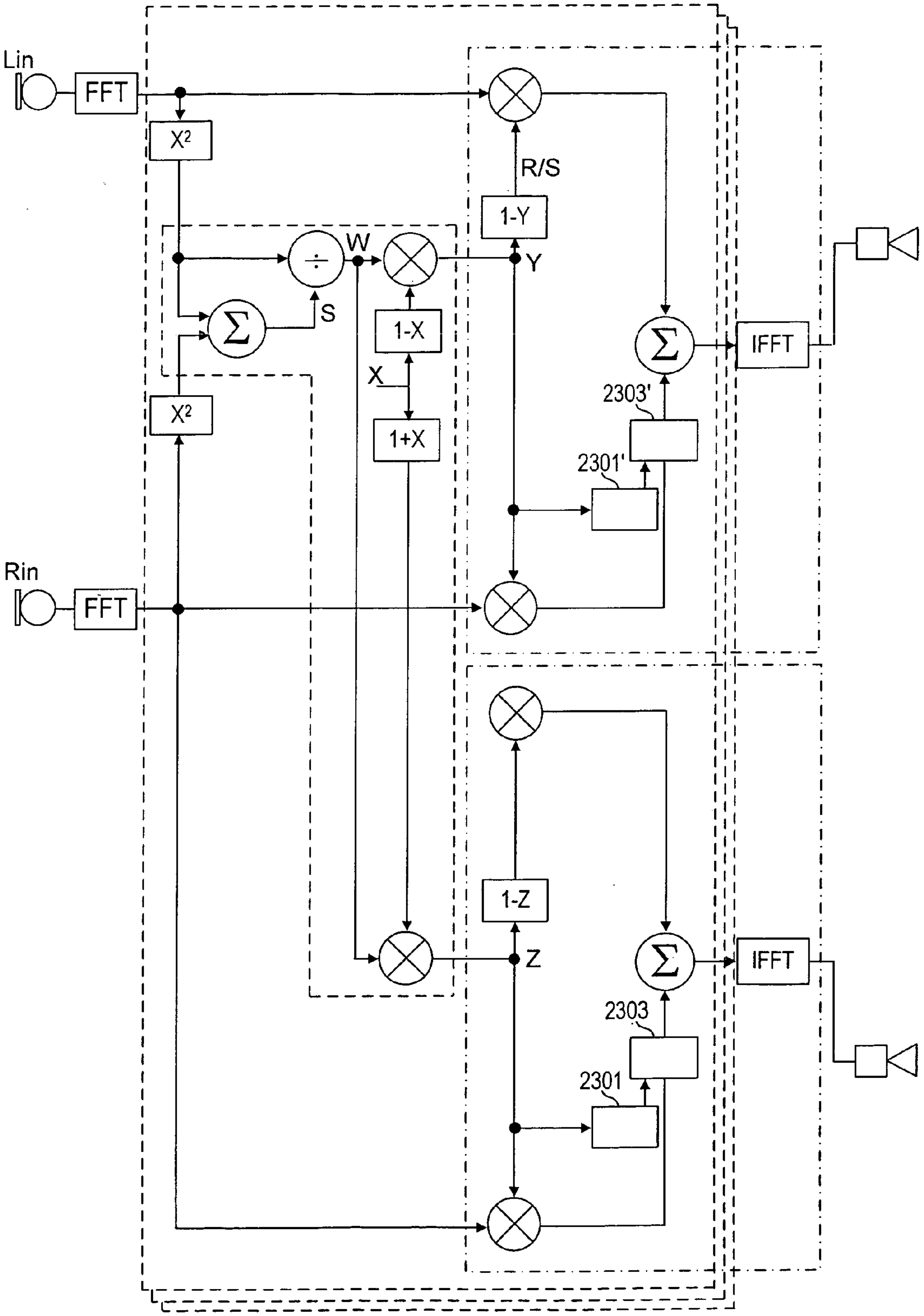
FIG. 23 is a block diagram of a binaural beamforming system with IAD correction.

Referring to FIG. 22, a block diagram is shown of a monaural beamformer like that of FIG. 10, modified to perform phase equalization as described. A phase controller 2201 is responsive to the signal W to produce frequency-dependent phase corrections to be applied to different frequency components. The phase controller may take the form of a lookup table or a mathematical calculation. A phase shifter block 2203 receives the phase corrections from the phase controller and applies the phase corrections to the different frequency components. Similar components 2201' and 2203' appear in dashed lines in the right ear signal path. Whether elements 2201 and 2203 are used or elements 2201' and 2203' are used, the result is the same. Alternatively, both elements 2201 and 2203 and elements 2201' and 2203' may be used, in which case the phase corrections would be halved such that half of the shift is applied in each of the left ear path and the right ear path. FIG. 23 shows an embodiment of a corresponding binaural beamformer, including phase controllers 2301 and 2301' and phase shifter blocks 2303 and 2303'.

Figure 24:
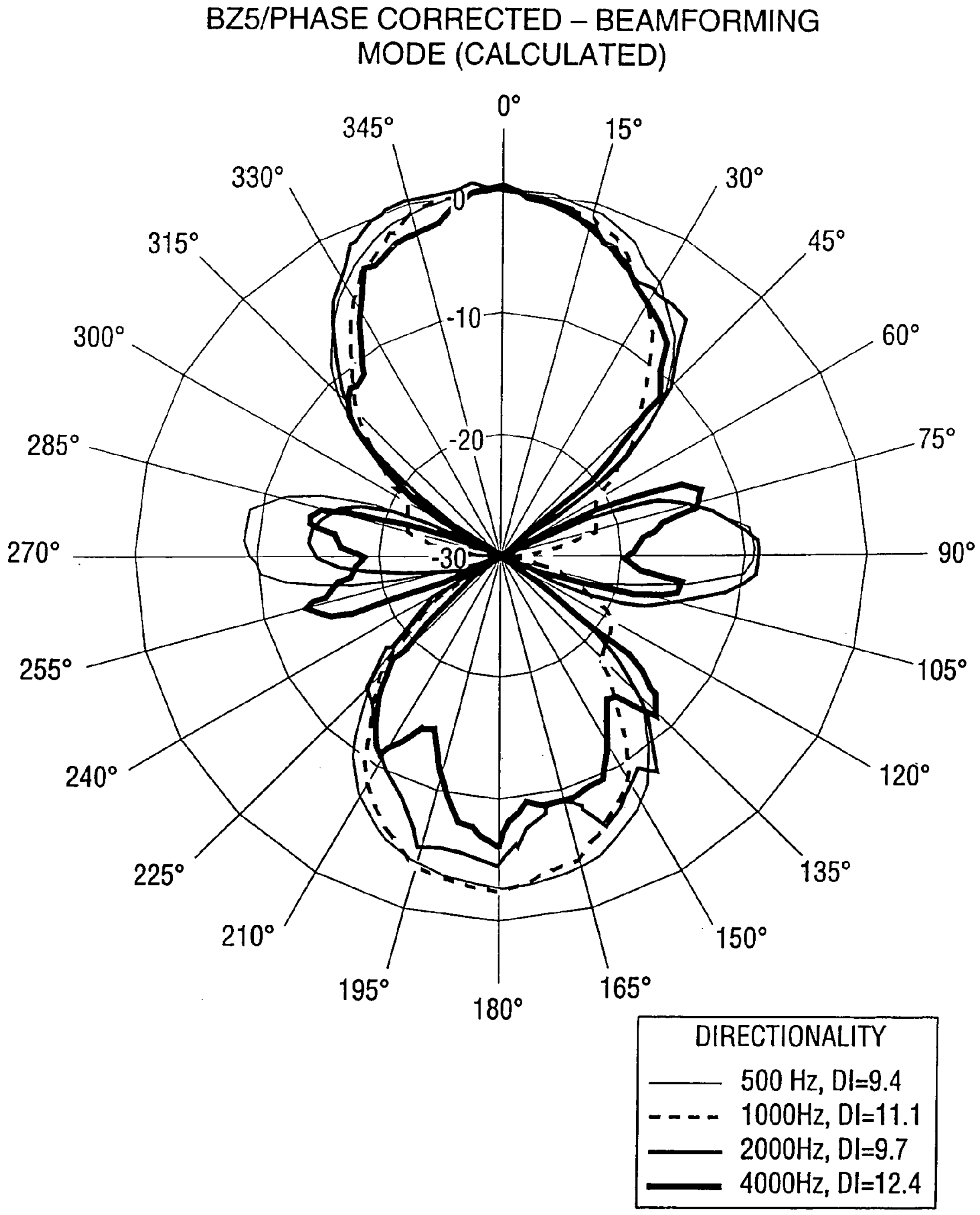
FIG. 24 is plot is a plot of the polar response patterns and DI values in a beamforming system using first-order directional microphones and IAD correction.

The expected results of phase correction are shown in FIG. 24. In the case of the frontal lobe, the response pattern is very similar regardless of frequency. Furthermore, in comparison with FIG. 12, the DI values of FIG. 24 show substantial improvement.

Although the present invention has been described primarily in a hearing health care context, the principles of the invention can be applied in any situation in which an obstacle to energy propagation is present between sensors or is provided to create a shadowing effect like the head shadowing effect in hearing health care applications. The energy may be acoustic, electromagnetic, or even optical. The invention should therefore be understood to be applicable to sonar applications, medical imaging applications, etc.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of combining multiple sound signals to provide an enhanced sound output, each of the multiple sound signals having a target signal portion and a noise signal portion, comprising:

determining respective noise power levels of all or part of each of the multiple sound signals, in which the multiple sound signals comprise a right sound signal and left sound signal;

weighting the sound signals by applying a lesser weight to a sound signal having a higher noise power level and a greater weight to a sound signal having a lower noise power level to obtain weighted sound signals, wherein the right sound signal is weighted as a function of a ratio of noise power for the left sound signal divided by a sum of noise powers for the right and left sound signals, and the left sound signal is weighted as a function of a ratio of noise power for the right sound signal divided by a sum of noise powers for the right and left sound signals, wherein the ratio of the noise power for the left sound signal divided by the sum of noise powers for the right and left sound signals does not have a right sound signal in its numerator, and wherein the ratio of the noise power for the right sound signal divided by the sum of noise powers for the right and left sound signals does not have a left sound signal in its numerator; and combining the weighted sound signals to produce an output signal.

2. The method of claim 1, further comprising:

splitting the multiple sound signals into multiple bands; and for each of the multiple bands, performing the power level determining, weighting and combining steps for that band.

3. The method of claim 1, further comprising producing an additional output signal based on weighting of the multiple sound signals.

4. The method of claim 3, wherein the output signals include a right output signal and a left output signal, and, in the right output signal, the right sound signal is weighted differently than indicated by relative noise powers of the right and left sound signals in accordance with a binaurality coefficient and, in the left output signal, the left sound signal is weighted differently than indicated by relative noise powers of the right and left sound signals in accordance with a binaurality coefficient.

5. The method of claim 4, further comprising providing a separate binaurality coefficient for each of multiple frequency bands, and applying the separate binaurality coefficient to the multiple sound signals on a band-by-band basis.

6. A sound processing apparatus for processing multiple sound signals, each of the multiple sound signals having a target signal portion and a noise signal portion, comprising:

means for determining respective noise power levels of all or part of each of the multiple sound signals, in which the multiple sound signals include a right sound signal and a left sound signal;

means for determining a weighting of the multiple sound signals in accordance with the power within the multiple sound signals such that a lesser weight is assigned to a noisier sound signal and a greater weight is assigned to a quieter sound signal, in which the weighting means determines a weighting for the right sound signal as a function of a ratio of noise power for the left sound signal divided by a sum of noise powers for the right and left sound signals, and determines a weighting for the left signal as a function of a ratio of noise power for the right sound signal divided by the sum of noise power for the right and left sound signals, wherein the ratio of the noise power for the left sound signal divided by the sum of noise powers for the right and left sound signals does not have a right sound signal in its numerator, and wherein the ratio of the noise power for the right sound signal divided by the sum of noise powers for the right and left sound signals does not have a left sound signal in its numerator; and means for combining the weighted sound signals to obtain an output signal.

7. The apparatus of claim 6, further comprising:

means for splitting the multiple sound signals into multiple bands; and for each of the multiple bands, means for performing the power level determining, weighting and combining for that band.

8. The apparatus of claim 7, wherein the weighting means determines multiple weightings of the multiple sound signals, and the combining means produces an additional output signal based on the multiple weightings.

9. The apparatus of claim 8, wherein the output signals include a right output signal and a left output signal, and, in the right output signal, the right sound signal is weighted differently than indicated by relative powers of the right and left sound signals in accordance with a binaurality coefficient and, in the left output signal, the left sound signal is weighted differently than indicated by relative powers of the right and left sound signals in accordance with a binaurality coefficient.

10. The apparatus of claim 6, wherein the apparatus is a hearing aid configured to be worn on the head of a user.

11. A method of combining right and left sound signals to provide an enhanced sound output, comprising:

determining respective noise power levels of all or part of each of the right and left sound signals;

weighting the right signal as a function of a ratio of noise power for the left sound signal divided by a sum of noise powers for the right and left sound signals, wherein the ratio of the noise power for the left sound signal divided by the sum of noise powers for the right and left sound signals does not have a right sound signal in its numerator;

weighting the left sound signal as a function of a ratio of noise power for the right sound signal divided by a sum of noise powers for the right and left sound signals, wherein the ratio of the noise power for the right sound signal divided by the sum of noise powers for the right and left sound signals does not have a left sound signal in its numerator; and combining the weighted right and left sound signals to produce an output signal.

12. The method of claim 11, further comprising:

splitting the right and left sound signals into multiple bands; and for each of multiple bands, performing the power level determining, weighting and combining steps for that band.

13. The method of claim 11, further comprising producing multiple output signals in accordance with multiple weightings of the right and left sound signals.

14. The method of claim 13, wherein the multiple output signals include a right output signal and a left output signal, and, in the right output signal, the right sound signal is weighted differently than indicated by relative noise powers of the right and left sound signals in accordance with a binaurality coefficient and, in the left output signal, the left sound signal is weighted differently than indicated by relative noise powers in accordance with a binaurality coefficient.

15. The method of claim 14, further comprising providing separate binaurality coefficients for each of multiple frequency bands, and applying the binaurality coefficients to the right and left sound signals on a band-by-band basis.

16. A sound processing apparatus for processing right and left sound signals, comprising:

means for determining respective noise power levels of all or part of each of the right and left signals;

means for determining a weighting for the right sound signal as a function of the ratio of noise power for the left sound signal divided by a sum of noise powers for the right and left sound signals, and determining a weighting for the left signal as a function of a ratio of noise power for the right sound signal divided by a sum of noise powers for the right and left sound signals, wherein the ratio of the noise power for the left sound signal divided by the sum of noise powers for the right and left sound signals does not have a right sound signal in its numerator, and wherein the ratio of the noise power for the right sound signal divided by the sum of noise power for the right and left sound signals does not have a left sound signal in its numerator; and means for combining the weighted right and left sound signals to obtain an output signal.

17. The apparatus of claim 16, further comprising:

means for splitting the right and left sound signals into multiple bands; and for each of multiple bands, means for performing the power level determining, weighting and combining for that band.

18. The apparatus of claim 16, wherein the weighting means determines multiple weightings of the right and left sound signals, and the combining means produces multiple output signals in accordance with the multiple weightings.

19. The apparatus of claim 18, wherein the multiple sound signals include a right sound signal and a left signal, the multiple output signals include a right output signal and a left output signal, and, in the right output signal, the right sound signal is weighted differently than indicated by relative powers of the right and left sound signals in accordance with a binaurality coefficient and, in the left output signal, the left sound signal is weighted differently than indicated by relative powers in accordance with a binaurality coefficient.

20. The apparatus of claim 16, wherein the apparatus is a hearing aid configured to be worn on the head of a user.

* * * * *